United States Patent [19]
Frosch et al.

[11] 3,926,500
[45] Dec. 16, 1975

[54] METHOD OF INCREASING THE DEPTH OF FOCUS AND OR THE RESOLUTION OF LIGHT MICROSCOPES BY ILLUMINATING AND IMAGING THROUGH A DIAPHRAGM WITH PINHOLE APERTURES

[75] Inventors: Albert Frosch, Herrenberg-Affstaett; Hans Erdmann Korth, Stuttgart, both of Germany

[73] Assignee: International Business Machines Corporation, Armonk, N.Y.

[22] Filed: Dec. 2, 1974

[21] Appl. No.: 528,965

[52] U.S. Cl. .................. 350/17; 350/14; 350/274
[51] Int. Cl.² .................. G02B 21/06; G05D 25/00
[58] Field of Search .......... 350/273, 274, 275, 266, 350/91, 9, 14, 15, 19, 88, 17, 6, 7, 285; 356/203, 125, 126; 178/7.6

[56] References Cited
UNITED STATES PATENTS

| | | | |
|---|---|---|---|
| 2,897,722 | 8/1959 | Gunter et al. | 356/126 |
| 3,013,467 | 12/1961 | Minsky | 356/203 |
| 3,052,168 | 9/1962 | Reed | 350/274 |
| 3,398,634 | 8/1968 | McLachlin | 350/19 |
| 3,421,806 | 1/1969 | Weber | 350/19 |
| 3,518,014 | 6/1970 | Weber | 350/91 |
| 3,547,512 | 12/1970 | Baer | 350/6 |
| 3,623,809 | 11/1971 | Diprose et al. | 350/91 |

*Primary Examiner*—Alfred E. Smith
*Assistant Examiner*—Jon W. Henry
*Attorney, Agent, or Firm*—Robert Lieber

[57] ABSTRACT

In order to increase the depth of focus of a high resolution microscope objective a diaphragm having small openings 25, 26 is rotatably mounted in plane 13 which is conjugate to object plane 12. Object 11 is illuminated (scanned) through semi-transparent mirror 19 and said diaphragm in such a way that light passing through said openings is sharply focused only on areas lying near to, or in object plane 12 within the depth of focus range of objective 2. Only light scattered or reflected from such areas passes through said openings substantially without losses and after passing through lens 20 provides a clear image of high contrast of those areas of object 11 which lie within the depth of focus of lens 2.

Light coming (reflected, scattered) from all other areas of object 11 lying outside the depth of focus is subject to substantial losses so that no image appears at 22.

If object 11 is moved cyclically with say 50 cps vertically to plane 12 so that all object points pass at least once through the depths of focus range of lens 2 a clear image of high contrast of all object points is visible at 22.

8 Claims, 5 Drawing Figures

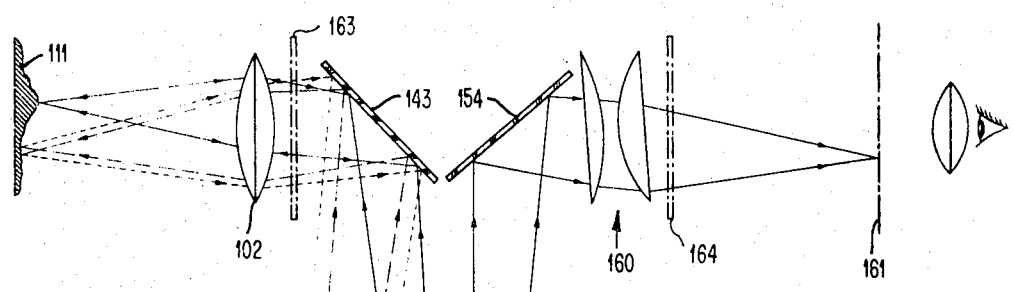
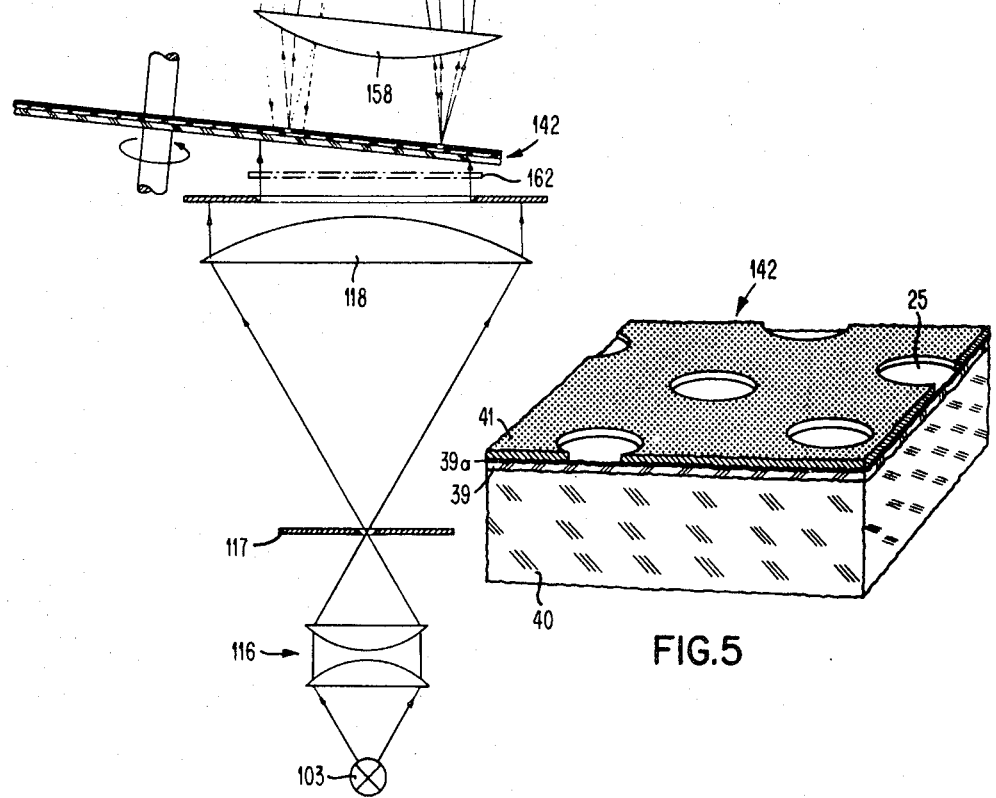
FIG.4
FIG.5

METHOD OF INCREASING THE DEPTH OF FOCUS AND OR THE RESOLUTION OF LIGHT MICROSCOPES BY ILLUMINATING AND IMAGING THROUGH A DIAPHRAGM WITH PINHOLE APERTURES

Introduction

The invention relates to a method and an arrangement for carrying out said method of increasing and depth of focus and/or the resolution of light microscopes.

In the evaluation of microscopic images or photographs, for instance in the routine examination of sectional planes in medicine, biology, material testing, etc., particularly, however, in the testing of quality of surfaces in the controlling of manufacturing processes it has become evident that the microscopic examination of surfaces the unevenness of which is equal to, or higher than, the lateral resolution and thus also higher than the depth of focus of the microscopes used, demands much time and an extremely high concentration.

It is a known fact that owing to the wave character of the light, for a predetermined resolution of a microscope a specific objective aperture is required whose angle limits the obtainable depth of focus. This means that when stuctural details in the order of μm have to be resolved the depth of focus is within this range, too. If now a surface is to be examined the unevenness of which is approximately in the order of the tenfold of the necessary resolution the setting of the focus of the microscope has to be altered about ten times for each object range. Furthermore, stray light forming at the not sharply focused object points has the effect that the contrast is reduced to a highly disturbing extent. These disadvantages can be eliminated only partly by increasing the depth of focus.

The literature reference "A method to increase the depth of focus by two step image processing," by G. Hausler, Optics Communication, Vol. 6, No. 1, Sept., 1972 describes a method of increasing the depth of focus transmittable by a system. Said method, however, apart from a partial distortion of the image, shows the added disadvantage that a photograph of the object to be imaged has to be made first, the lack of sharpness of said photograph having partly to be cancelled subsequently in accordance with the method.

The literature reference "Optische Abbildung unter Uberschreitung der beugungsbedigten Auflosungsgrenze," by W. Lukosz and M. Mardhand, Physikalisches Institut, Technische Hochschule Braunschweig, Germany, Optica Acta 10, pp. 241, 1163 describes a possible but highly complicated method of increasing the resolution.

For a high resolution microscope examination of big numbers of elements with imperfectly planar surfaces these two above-mentioned processes are not advisable due to their complexity and their limited precision.

In electron raster microscopy, an object is scanned point by point with a very fine probe consisting of an electron beam. Owing to the particularly high focusing characteristics of the electron beam, and the shortness of the wave lengths to be associated to the individual electrons following the Schrodinger equation, the resolution and the depth of focus of such devices is much better than that of light microscopes. In view of the complexity of electron raster microscopes, however, they are quite unsuitable for the problems to be solved by the invention. Furthermore so-called television microscopes are known where the object, or an image of the object, is scanned point by point. An increase of the resolution or of the depth of focus is not achieved by this method. A transfer of the physical laws and technical steps causing the depth of focus and the high resolution of electronic raster microscopes, to light microscopes is not possible since there the image is obtained in an entirely different manner.

In the German pat. application OS 2.013.101 a device with a glass rod rotating in the object space for the periodic displacement of the sharply focused plane is described. With this device, however, only object planes removed from each other by at least several focal depth zones can be observed as with smaller distances one or several adjacent object planes are always imaged, too, more or less sharply so that at least the contrast of the respective object plane imaged with optimum sharpness is strongly reduced. Due to the glass rod rotatingly arranged in the object space this device can be used only with relatively small magnifications and thus large zones of depth of focus, so that generally only object planes spaced at least 10 to 20 μm from each other without interspersed object zones can be observed. Thus the use of such devices for most of the above-specified functions is excluded.

It is the object of the present invention to supply a method and an arrangement to increase the depth of focus and/or the resolution of light microscopes, said method and arrangement permitting imaging of discretionary object planes also with greatly magnified images, without the image being disturbed by planar zones of the object which are outside the range of the depth of focus, but close thereto.

According to the invention, this object is achieved by a method and an arrangement to carry out this method of increasing the depth of focus and/or the resolution of light microscopes, characterized in that an image of the object is scanned point by point by a single or multi-pinhole scanning diaphragm arranged in a plane conjugated to the plane to which the microscope objective is focused. For this purpose, use is made of the fact that on a pinhole diaphragm arranged conjugatedly to the sharply focused plane only those points are sharply imaged which lie exactly in the sharply focused plane. If in the individual image points there are pinholes of the diaphragm which have approximately the sizes of these image points the entire light, or a major part thereof, forming these image points is transmitted through the diaphragm and can, for instance via a beam splitter and a lens, by means of observation, photography, or a television camera tube, be evaluated in the image plane of said lens. If an object point is not within the plane to which the objective is sharply focused it is a known fact that also in a plane lying conjugatedly thereto it is not sharply focused, either. Accordingly, if an object point is not exactly in focus a pinhole of the diaphragm permits the passing of only a small part of the light forming the image of the object point, said light, with a correct dimensioning of the system, being of only minor disturbance, if at all, in the evaluating plane. If the pinhole diaphragm is made to rotate or oscillate in a direction extending within a plane being conjugated to the respective sharply focused plane the entire object is scanned point by point, whereby only points which are in the sharply focused plane, or more precisely in the focal depth range of the objective, contribute with full intensity to the image formed in the evaluating plane. By shifting the object in the direction of the optical axis it is thus possible to make visible successively various planes of an uneven object surface with good contrast and the full resolution of the aperture. By this measure it is achieved, inter alia, that the depth of focus which normally is approximately equal to the resolution is multiply increased.

A preferred embodiment of the inventive process is characterized in that the single or multi-pinhole scanning diaphragm arranged in a plane that is conjugated to the plane to which the objective is sharply focused, apart from scanning the image of the object, scans by a flying light spot pattern the areal zones of the object in said plane of the microscope objective. This scanning can be executed either by a movement of the diaphragm, or by mechanical or electro-optical or magneto-optical light deflectors.

According to another embodiment of the inventive process the object or the plane to which the object is sharply focused is shifted with great speed periodically in the direction of the optical axis, so that all object points between the two end positions of the object or of the said plane are imaged successively with high contrast and good resolution in the evaluating plane. If the scanning is performed in parallel or vertically to the object plane with sufficient speed the numerous individual images are integrated by the eye to one single sharp image. For photographies the scanning can be carried out with a lower speed.

According to still another particularly preferred embodiment of the inventive process the size of the pinholes of the scanning diaphragm is selected in such a manner that apart from the zero-th at least also the first order of the illuminating radiation diffracted at the diaphragm pinholes causing the scanning is within the aperture of the microscope objective, and that their images lie in the focal plane within the range of maximum resolution of the objective.

STATEMENT OF THE INVENTION

The invention improves not only the depth of focus, but through widely excluding the light coming from unfocused object planes it also improves the contrast and, to a certain extent, also the lateral resolution.

Further features of the invention are given in the subclaims and the specification in connection with the drawings which show the following:

DESCRIPTION OF THE DRAWINGS

FIGS. 3 and 4 are schematic representations of embodiments of the invention; and FIG. 5 is the schematic representation of the multipinhole scanning diaphragm used in the device according to FIG. 4.

DETAILED DESCRIPTION

Figure 1:
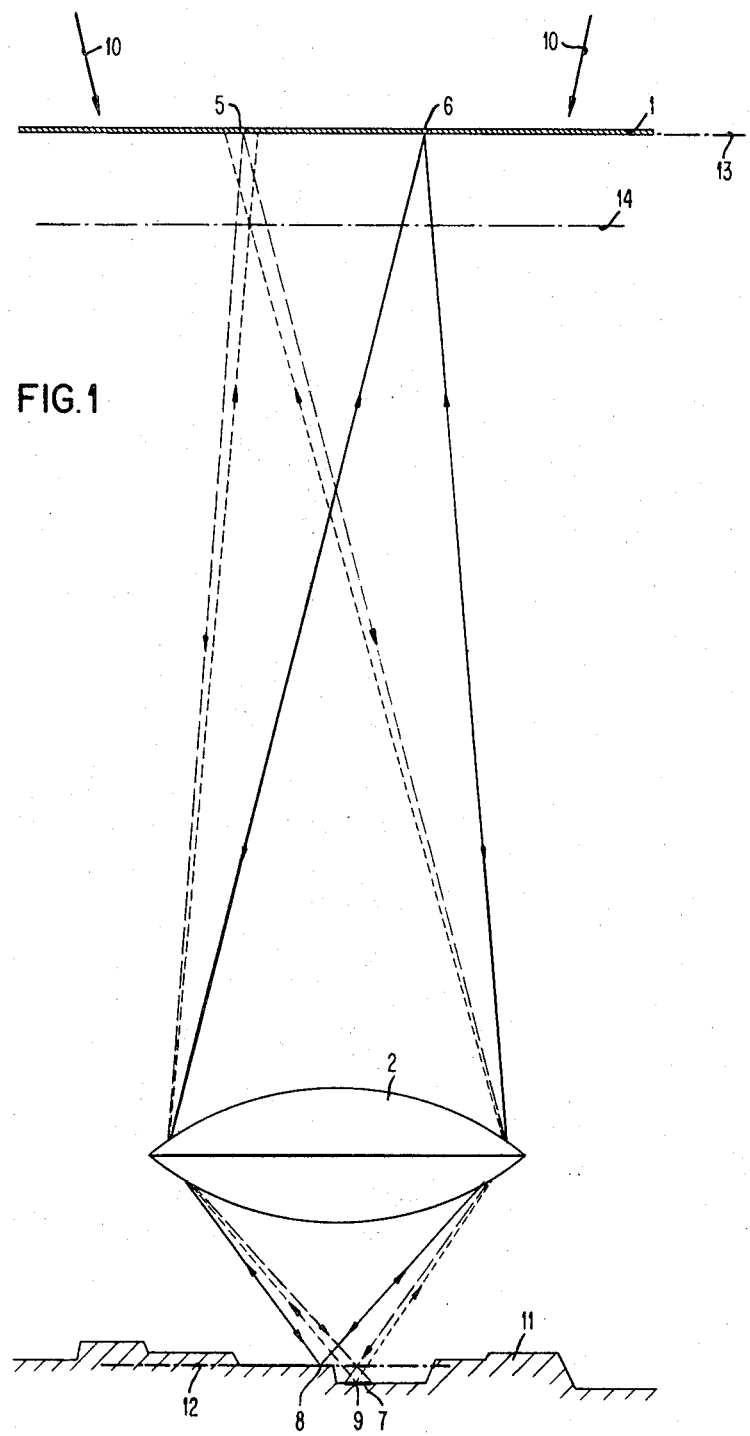
FIG. 1 is the schematic representation of the image of a diaphragm which lies in a plane that is conjugated to the plane to which a microscope objective is focused.

In FIG. 1, a radiation 10 converging in the center of a lens 2 in the manner of the Kohler-type microscope illumination impinges on a multi-pinhole diaphragm 1 in which for the sake of a clear representation only two pinholes 5 and 6 are shown. The diameter of 30 $\mu$m approximately of pinholes 5 and 6 is selected in such a manner that beside the zero-th order at least also the first order of the diffraction pattern reaching the plane of lens 2 lies within its aperture. If this condition is met pinholes 5 and 6 are sharply focused, e.g. as point 8, in plane 12 placed conjugatedly to plane 13 of diaphragm 1, objective 2 being sharply focused to said plane 12. The diameter of point 8 depends on the magnification by the objective lens 2. If this lens, for example, effects a 30-fold magnification, and if its resolution is about 1 $\mu$m, point 8 will have a diameter of 1 $\mu$, and will in turn be imaged in plane 13 as a light spot with a diameter of 30 $\mu$m. It is quite obvious that the image of point 8 is fully within the diaphragm pinhole 6, so that the entire light causing this image can pass through mask 1. If lens 2 would have a lower resolution, e.g. a resolution of 3 $\mu$m, diaphragm pinhole 6 could not be focused sharply on plane 12. Additionally, a light spot having a diameter of only 1 $\mu$m in plane 12 would not be sharply imaged in diaphragm plane 13 being conjugated thereto. Thus, the transmission characteristics of diaphragm 1 would be considerably deteriorated as only a fraction of the light causing the imaging of point 8 in diaphragm plane 13 could pass through diaphragm pinhole 5 or 6. The diameters of diaphragm pinholes 5 and 6 should therefore be selected in such a manner that apart from their zero-th diffraction orders at least also their first diffraction orders lie within the aperture of lens 2, and that the images of the diaphragm pinholes in the plane are not smaller than the resolution of this lens.

If a diaphragm pinhole, in FIG. 1 diaphragm pinhole 5, is imaged not in plane 12 but on a lower zone of object 11 the image is no longer point-like, as it would be in a zone within plane 12, but it has the form of an expanded light spot 7 the diameter of which is a function of the distance between plane 12 and the respective zone of object 11.

As furthermore shown in FIG. 1, a point 9 within light spot 7 is sharply focused not within the diaphragm plane 13 but in a plane 14 beneath plane 13, whereas in plane 13 there forms an unfocused image with a much larger diameter only a fraction of whose light can pass through diaphragm pinhole 5. The percentage of the light passing through diaphragm pinhole 5 is even lower when unfocused image 7 on object 11 with a bigger diameter than light spot 8 is involved.

Figure 2:
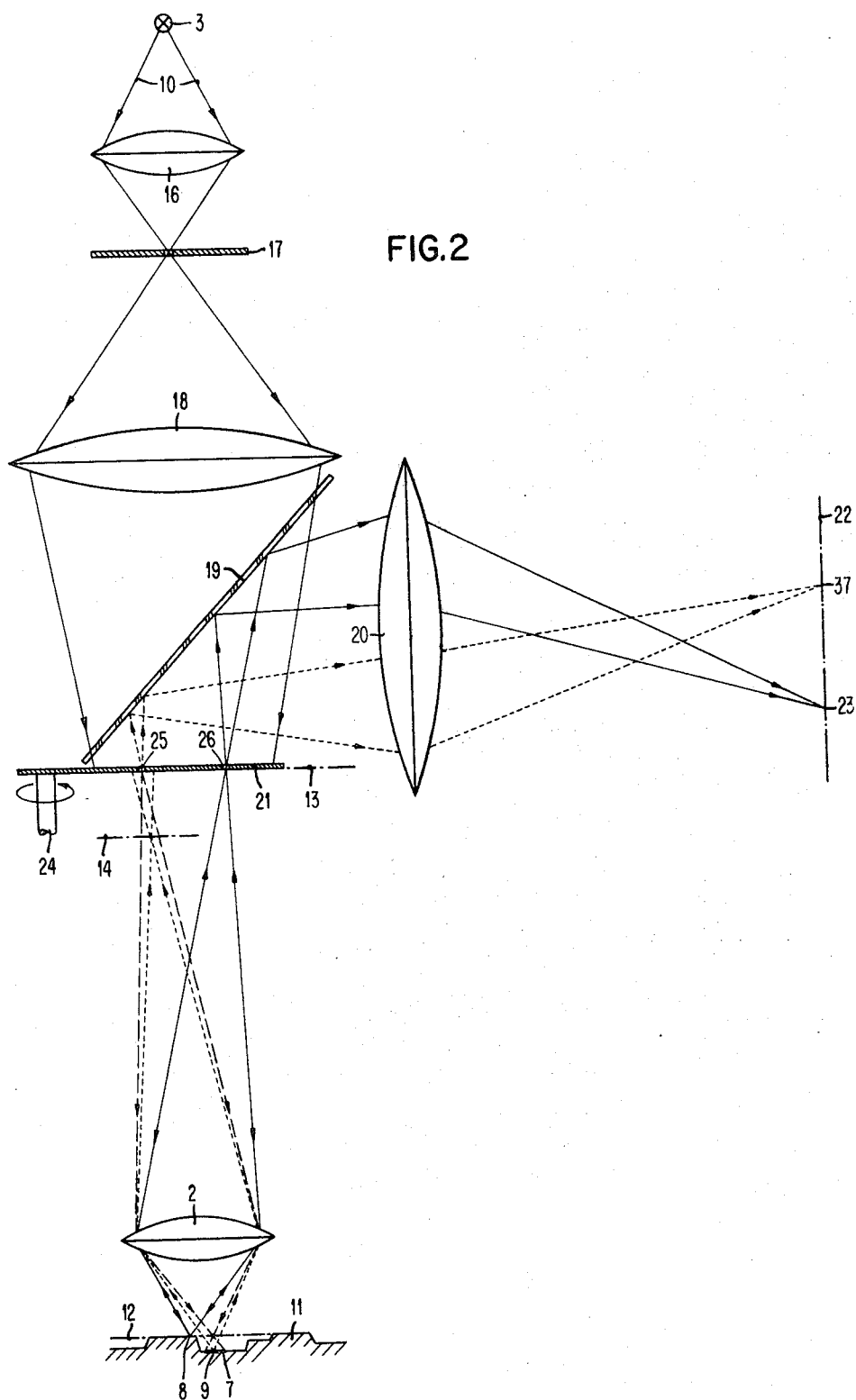
FIG. 2 is the schematic representation of a microscope with Kohler illumination, and an additional device for carrying out the inventive process.

FIG. 2 is a schematic representation of a microscope with Kohler-type illumination, and an additional device for executing the inventive process. Radiation 10 emanating from a light source 3 is focused through a lens 16 in the pinhole of a pinhole diaphragm 17, and by means of a lens 18 is transformed into a radiation converging on objective lens 2. The radiation leaving lens 18 passes through a beam splitter 19, a rotating scanning pinhole diaphragm 21, and lens 2 to generate in plane 12 images of diaphragm pinholes 25 and 26. Diaphragm pinhole 26 is sharply focused in plane 12 which is conjugated relative to the diaphragm plane, since the diaphragm pinholes 25 and 26 are dimensioned in such a manner, in the subject case 30 $\mu$m diameter. that at least the first diffraction order of the radiation passing through it lies within the aperture of lens 2, and that the diameter of point 8 representing the image of the diaphragm pinhole is not smaller than the solution of lens 2. With a 30-fold magnification of lens 2 the diameter of point 8 is 1 $\mu$m. As already explained in connection with the specification of FIG. 1, the light spot representing this image is sharply focused in the zone of plane 13 of diaphragm 21, and passes through diaphragm pinhole 26 completely, or at least almost completely. Subsequently, part of this ray is deflected at beam splitter 19 to a lens 20 and generates a focused light spot 23 in the zone of an evaluating plane 22. That part of radiation 10 coming from light source 3, which passes through diaphragm pinhole 25, is focused in the zone of plane 12, and impinges as a divergent ray on the zone of object 11 beneath said plane, where it forms an unfocused image in the form of an expanded light spot 7. Each point 9 of this light spot, in view of the fact that the zone of object 11 carrying it lies beneath plane 12, is sharply focused not in plane 13 conjugated thereto of diaphragm 21, but in a plane 14 beneath, which is conjugated to the surface carrying light spot 9, so that in the plane of diaphragm 21 a light spot is generated whose diameter is bigger than diaphragm pinhole 25. The image of light spot 7 in the plane of diaphragm 21 has an even bigger diameter than the image of point 9, so that only a small fraction of the light causing the image of light spot 7 in the plane of diaphragm 21 can pass through diaphragm pinhole 25. This radiation emaninating from pinhole 25 forming, as pointed out above, only a small fraction of the radiation impinging from below on the diaphragm, generates in evaluation plane 22 a light spot 37 that is of such low brightness that it is not visible, or at least disturbing. This occurs particularly in those cases where a device for setting a threshold value is used.

If diaphragm 21 which apart from pinholes 25 and 26 shows a large number of other pinholes is made to rotate quickly round an axis 24 all points of object 11 within the scope of objective lens 2 are scanned successively, and imaged on evaluation plane 22. The intensity of the object points imaged in evaluation plane 22, which lie in plane 12, is much higher than the intensity of the images of object points outside this plane.

In evaluation plane 22 there consequently appears a sharply focused image of points of object 11 which lie in plane 12. As all object points outside this plane are imaged in an unfocused way in plane 13, which causes only a poor illumination of the diaphragm pinholes, the contrast of the image of the areas of object 11 which line in plane 12 is scarcely reduced. If object 11 is shifted upwards to such an extent that point 9 lies in plane 12 this point, and all other points of object 11 that are on the same level are sharply focused in evaluation plane 22, whereas point 8 and all points of the object which are on the same level are so poorly imaged in evaluation plane 22 that they are either not at all visible, or deteriorate the contrast only to a negligible extent.

Figure 3:
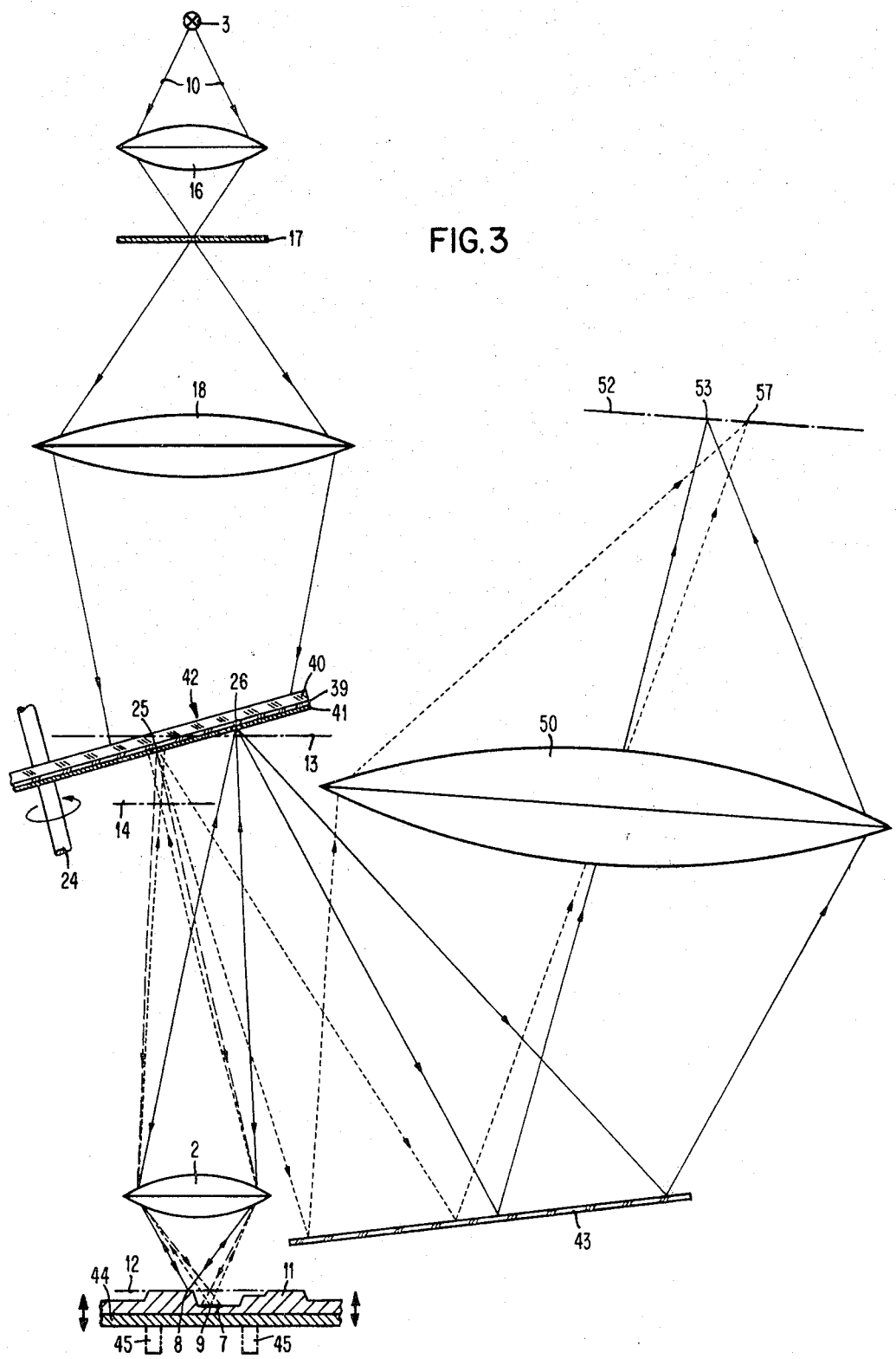

FIG. 3 is the schematic representation of an embodiment of the invention, with which the inventive process can be executed in a particularly simple and clear manner. Radiation 10 emanating from a light source 3 is focused through a lens 16 in the pinhole of a pinhole diaphragm 17, and impinges on a lens 18 through which it is transformed into a radiation converging in the center of microscope objective lens 2. This radiation passes through an element 42 consisting of a transparent carrier element 40, a partially reflecting layer 39, and a scanning pinhole diaphragm 41. Pinhole diaphragm 41 contains, apart from pinholes 25 and 26 shown in the drawing, a plurality of other pinholes whose diameter, as explained more closely in connection with the description of the preceding figures, lies between 30 and 50 $\mu$m. The radiation passing through partially reflecting layer 39 and the pinholes, e.g. pinholes 25 and 26, impinges on lens 2, at least the first diffraction order being within the aperture of this lens. As described in detail in connection with the description of the preceding figures, diaphragm pinhole 26 is sharply focused on point 8 in plane 12 of object 11, said point 8 in turn being sharply focused in the zone of pinhole 26 lying in the immediate vicinity of a plane 13 which is conjugated to plane 12. The inclination of element 42 consisting of carrier element 40, partly reflecting layer 39, and pinhole diaphragm 41 with respect to plane 13 has been exaggerated in the figure for better understanding. The radiation passing through pinhole 26 in upward direction is partially reflected at partially reflecting layer 39, passes through the pinhole for a second time, and reaches via a mirror 43 a lens 50 through which it is focused as light spot 53 in an observation plane 52 where it generates a sharply focused image of light spot 8 which in turn represents an image of pinhole 26. As also explained in detail in connection with the description of FIGS. 1 and 2, the radiation passing through pinhole 25 generates on the surface, beneath plane 12, of object 11 a light spot 7 representing an unfocused image, said light spot 7 in turn being imaged in an unfocused manner within the zone of pinhole 25 so that only a small part of the light generating this image is reflected at partially reflecting layer 39, and generates, in evaluating plane 52, via mirror 43 and lens 50, an image 57 of very low intensity of pinhole 25. Outside pinholes 25, 26, etc. permitting the passage of light onto and from partially reflecting layer 39 the surface of scanning diaphragm 41 is energy-consuming, i.e. of a matt black.

If element 42 consisting of carrier element 40, partially reflecting layer 39, and pinhole diaphragm 41 is made to rotate at high speed by means of axis 24 the entire surface of object 11 within the range of objective lens 2 is scanned point by point, so that in the zone of evaluation plane 52 a sharply focused image of strong contrast of the surface elements of object 11 lying in plane 12 becomes visible. All surface elements of object 11 which are outside plane 12 and have thus been scanned in an unfocused manner are imaged in evaluation plane 52 with a considerable loss of light, so that they are either not visible at all, or disturb only to a small extent the contrast of the images of the surface elements of object 11 which lie within plane 12. If another plane of object 11 is to be made visible piezoelectric or magneto-strictive elements 45 carrying table 44 are excited via lines that are not shown, so that object 11 shifts upward or downward in the direction of the optical axis of objective lens 2 to such an extent that the plane of object 11 which is provided for reproduction in the evaluation plane 52 coincides with plane 12. However, it is also possible to shift objective 2 periodically instead of object 11. If the entire surface of object 11 is to be made visible or evaluable simultaneously, an alternating voltage is applied to the piezoelectric of magnetostrictive elements 45, with a frequency which is much higher or lower than the scanning frequency of pinhole diaphragm 41. Through this alternating voltage having a frequency of e.g. 30 cps or 50 kcsp object 11 is periodically shifted upward and downward in the direction of the optical axis of objective lens 2, to such an extent that all surface zones to be made visible in evaluation plane 52 pass through plane 12. In this manner, there appear in evaluation plane 52 in rapid succession all levels of the surface of object 11 as sharply focused images. During the imaging of a predetermined plane of object 11, those surface areas of object 11 which are correlated to other planes are practically invisible in evaluation plane 52, or represent only a negligible disturbance of the contrast of the respective sharply focused planes. Owing to the quick succession of images the individual images are integrated by the human eye and appear to the observer as an image that is flicker-free, sharply focused and has a resolution that is equal to the stroke of object 11. If the image generated in evaluation plane 52 is to be photographed the X-, Y-, Z- scanning, i.e. the scanning caused by rotating diaphragm 41, and the vertical movement of table 44 can be made much slower. For better observation of the image generated in evaluation plane 52 a projection screen or a ground glass plate can be provided. It is, however, also possible to generate the image formed by lens 50 on the screen of a television tube, on a photodiode matrix, or on another suitable evaluation device. It is of course also possible to alter at a high speed, instead of altering the distance between objective lens 2 and object 11, the focal length of objective lens 2, e.g. by electro-optical means.

By means of joining diaphragm 41 and partly reflecting layer 39 into a common element, the disturbances caused by stray light in the arrangement of FIG. 2 are almost completely suppressed. Additionally, this measure as well as a grid-like arrangement of the scanning diaphragm pinholes increase to a predetermined degree the resolution of the entire optical system, as described for instance in the literature reference "Optische Abbildung unter Uberschreitung der beugungbedingten Auflosungsgrenze," by W. Lukosz and Marchand, Optica Acta, 10, p. 241, 1963.

FIG. 4 shows another embodiment of the invention. The preferably monochromatic light emanating from light source 103 is focused through lenses 116 in the pinhole diaphragm 117, and projected by means of a lens 118 as a converging bundle of rays through a polarizer 162 on a rotating element 142 which is designed as shown in the arrangement of FIG. 5. The perpendicular of this element and the optical axis of lenses 116, 118 enclose an angle at which the radiation exiting from polarizer 162 can pass unimpaired through layer 39 of element 142, said layer having the effect of a polarization-dependent beam splitter. The light passing through the diaphragm pinholes which in the drawing are represented by white zones is focused onto an object 111 through a lens 158, a deflecting mirror 143, and an objective 102. The diameter of the diaphragm pinholes, and the magnification of the lenses are dimensioned as described in connection with the description of FIGS. 1 to 3. As described in the same connection already, the pinholes are sharply focused only in those zones of object 111 which are in a plane that is conjugated to element 142. In the same manner only the illuminated object points in this plane are sharply focused on element 142. As the polarization plane of the radiation generating the images on the upper side of element 142 is turned by 90°, owing to the fact that the radiation passes twice through λ/4 plate 163, this radiation is reflected without loss at layer 39, so that the thus illuminated diaphragm pinholes are sharply focused in an evaluation plane 161 with maximum intensity, via lens 158, a deflecting mirror 154, lenses 160, and a polarizer 164 suppressing undesired stray light. All objects points which are in a plane that is not conjugated to element 142 are imaged in an unfocused manner on element 142, so that only a small fraction of the light generating these images is reflected at layer 39 and generates an image of very low intensity in evaluation plane 161. The object can be periodically shifted in the direction of the optical axis of objective 102, analogously to FIG. 3, by means not shown in FIG. 4., so that with an element 142 rotating with sufficient speed it is imaged with great depth of focus in evaluation plane 161.

FIG. 5 shows an enlarged section of element 42 or 142, respectively. The arrangement consists of a transparent carrier element 40, made for instance of glass, a layer 39 acting as a polarization-dependent beam splitter and coated with a quartz layer 39a, and a pinhole diaphragm 41 which consists of chromium and has a specular surface.

Beside the visual examination of semiconductor wafers showing irregularities of the surface, the present invention can also perform automatic examinations. There, the object points which can be observed in each object plane can be divided into groups and stored in a computer in accordance with their profile heights. In the same manner, large quantities of particles can be examined, counted and classified in accordance with their size. It is also possible to make with this invention sectional views of transparent bodies, e.g. crystals.

While the invention has been particularly shown and described with reference to preferred embodiments thereof, it will be understood by those skilled in the art that various changes in form and detail may be made therein without departing from the spirit and scope of the invention.

What is claimed is:

1. Apparatus for producing magnified images of non-flat object surface areas with enhanced depth contrast and resolution of detail comprising:
   an objective lens;
   means containing plural co-planar pinhole apertures, each pinhole aperture for transmitting a beam of light thru said lens to be incident on an object surface and for re-transmitting a spot-imaged beam of light returned by said lens after scattering reflection of said incident beam from said surface;
   means for shifting focal coordinates of each incident beam in three dimensions relative to said surface; and
   means for utilizing light returned through said apertures to form said magnified images.

2. Apparatus according to claim 1 in which said apertures are dimensioned to pass at least zero-th and first order diffraction components of light presented thereto and to form spot images, relative to an area encompassing multiple spots in the focal plane of said lens, which are at least as large as the spot resolution of said lens.

3. Apparatus according to claim 2 in which said means containing said apertures comprises a rotatably mounted multiapertured plate and said means for coordinate shifting comprises means for concurrently rotating said plate and varying the distance between said objective lens and object, thereby varying area and depth focal coordinates of said lens relative to said object surface.

4. Apparatus in accordance with claim 3 in which said coordinate shifting is carried out repeatedly at a rate suited for permitting "flicker-free" human viewing of said magnified image.

5. Apparatus in accordance with claim 3 wherein said image forming means includes a partially transmisive/partially reflective element for passing transmitted light unidirectionally to said object surface and for passing retransmitted light unidirectionally from said object surface to an evaluation plane offset and isolated from the path of said transmitted light.

6. Apparatus in accordance with claim 6 wherein said partially transmissive/partially reflective element is parallel and adjacent to said plate, and mounted for co-rotation with said plate by said coordinate shifting means.

7. Apparatus in accordance with claim 6 wherein said plate and element form a plural-layered composite structure inclined at an oblique angle to the optical axis of the objective lens.

8. Apparatus in accordance with claim 7 including a polarizer, for polarizing light transferred to said composite structure for imaging on said object, and means located between said objective lens and structure for altering the polarization of light scattered from said object so as to prevent echoing, and potentially interfering, transfers of light between said object and element.

* * * * *